United States Patent
Ebel

(10) Patent No.: US 6,876,540 B2
(45) Date of Patent: Apr. 5, 2005

(54) ELECTROLYTE FOR USE IN A CAPACITOR

(75) Inventor: Thomas Ebel, Segrate/Milan (IT)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 10/467,021

(22) PCT Filed: Dec. 27, 2001

(86) PCT No.: PCT/DE01/04904
§ 371 (c)(1),
(2), (4) Date: Jan. 16, 2004

(87) PCT Pub. No.: WO02/061777
PCT Pub. Date: Aug. 8, 2002

(65) Prior Publication Data
US 2004/0114308 A1 Jun. 17, 2004

(30) Foreign Application Priority Data
Feb. 1, 2001 (DE) .......... 101 04 573

(51) Int. Cl.$^7$ .................. H01G 9/02
(52) U.S. Cl. .......... 361/506; 361/509; 361/529; 252/62.2
(58) Field of Search .......... 361/503, 504, 361/506, 525, 528, 529; 252/62.2

(56) References Cited

U.S. PATENT DOCUMENTS

| | | |
|---|---|---|
| 3,052,829 A | 9/1962 | Ross et al. |
| 4,664,830 A * | 5/1987 | Shinozaki et al. ......... 252/62.2 |
| 4,762,632 A * | 8/1988 | Shinozaki et al. ......... 252/62.2 |
| 4,786,429 A * | 11/1988 | Mori et al. ................ 252/62.2 |

FOREIGN PATENT DOCUMENTS

| | | |
|---|---|---|
| DE | 26 08 409 | 9/1976 |
| DE | 693 04 732 | 2/1997 |
| DE | 695 08 286 | 7/1999 |
| EP | 0 556 948 A2 | 8/1993 |
| GB | 679539 | 9/1952 |
| JP | 56-54031 | 5/1981 |
| JP | 59189568 | 10/1984 |
| JP | 02054511 | 2/1990 |
| JP | 03125417 | 5/1991 |
| JP | 03240217 | 10/1991 |
| JP | 06045196 | 2/1994 |
| JP | 11354101 | 12/1999 |

* cited by examiner

Primary Examiner—Anthony Dinkins
(74) Attorney, Agent, or Firm—Fish & Richardson P.C.

(57) ABSTRACT

An electrolyte includes (a) 70–99 wt. % of ethylene glycol, and (b) 1–2 wt. % of a substance which is selected from a group that includes the following carboxylic acids and carboxylic acid salts: substituted cinnamic acids, ammonium cinnamate, ammonium α-methyl cinnamate, and ammonium trans-4-phenyl-3-butenoate. The electrolyte may be used in an aluminum electrolytic capacitor.

10 Claims, 1 Drawing Sheet

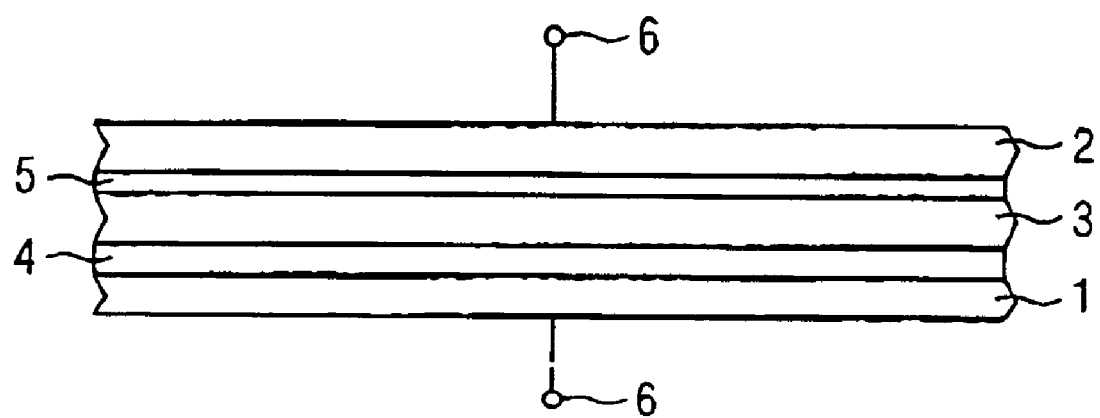

ELECTROLYTE FOR USE IN A CAPACITOR

CROSS-REFERENCE TO RELATED APPLICATIONS

This application claims priority to PCT Application No. PCT/DE01/04904, filed on Dec. 27, 2001, and to German Patent Application No. 101 04 573.5, filed on Feb. 1, 2001.

FIELD OF THE INVENTION

The invention concerns an operating electrolyte for an aluminum electrolytic capacitor that contains ethylene glycol. In addition, the invention concerns an aluminum electrolytic capacitor with the operating electrolyte. The invention also concerns the use of the aluminum electrolytic capacitor.

BACKGROUND

Aluminum electrolytic capacitors are constructed as a stack of layers of a cathode foil, which may be, for example, a thin, roughened Al foil having a thickness between 20 and 50 µm, and of an anode foil, which may be, for example, a roughened Al foil around 100 µm thick, and which has a dielectrically operative oxide layer that is deposited on the foil by an electrochemical process. The cathode foil too has a thin oxide layer, around 1.5–3 nm thick. The stack of layers is usually present in the form of a coil wound around a mandrel, which is built into an aluminum cup.

Between the foils there is a course of one or more layers of paper, which is impregnated with the operating electrolyte. This operating electrolyte constitutes the actual cathode.

Operating electrolytes of the type named at the beginning that also contain ammonium benzoate are known. German Patent 693 04 732 Part 2 discloses an electrolyte that contains benzoic acid or its ammonium salts and additional aliphatic dicarboxylic or tricarboxylic acids together with solvents, which include ethylene glycol and other alcohols. These operating electrolytes have the disadvantage of a low sparking voltage of about 300 V. Consequently, the aluminum electrolytic capacitors made with the known operating electrolytes are not suitable for operation with higher voltages.

SUMMARY

The object of the present invention is therefore to provide an operating electrolyte for aluminum electrolytic capacitors that has a high sparking voltage.

This object is achieved according to the invention by an operating electrolyte according to Claim 1. Additional embodiments of the invention, an aluminum electrolytic capacitor with the operating electrolyte according to the invention, and the use of the aluminum electrolytic capacitor, may be seen from the additional claims.

The invention specifies an operating electrolyte with:
a) 70–99 weight percent ethylene glycol
b) 1–20 weight percent of a substance that contains derivatized aromatic carboxylic acids.

In addition to these essential components, the operating electrolyte according to the invention may contain small quantities of additional components that do not detract from the desired properties of the electrolyte.

The operating electrolyte according to the invention has the advantage that it is possible to achieve a higher sparking voltage by exchanging the ammonium benzoate for a substance containing derivatized aromatic carboxylic acids.

Furthermore, despite the increased sparking voltage, the change in conductivity of the operating electrolyte is insignificant.

In addition, an operating electrolyte for aluminum electrolytic capacitors that contain the following components is particularly advantageous:
a) 90–99 weight percent ethylene glycol
b) 1–10 weight percent of a substance that contains derivatized aromatic carboxylic acids.

In addition to these essential components, the operating electrolyte according to the invention may also contain small amounts of other common components that do not detract from the desired properties of the electrolyte.

In addition, it is particularly advantageous to select the derivatized aromatic carboxylic acids from a group of substances that include substituted cinnamic acids and ammonium trans-4-phenyl-3-butenoate.

Cinnamic acids that can be considered for substitution here include in particular ammonium cinnamate, ammonium o-methylcinnamate, ammonium p-methylcinnamate, ammonium α-methylcinnamate and ammonium 4-hydroxycinnamate.

The invention also specifies an aluminum electrolytic capacitor in which the electrolyte is the operating electrolyte according to the invention. The capacitor has a stack of layers, with an anode layer and a cathode layer. Positioned between the anode layer and the cathode layer is a separating layer impregnated with the electrolyte. The anode layer and the cathode layer each have an oxide layer on their side that faces the separating layer. The anode layer and the cathode layer are of aluminum, while the oxide layers are of aluminum oxide.

The aluminum electrolytic capacitor according to the invention has the advantage that it can be operated at a higher operating voltage due to the use of the operating electrolyte with high sparking voltage according to the invention.

The invention also specifies the use of the aluminum electrolytic capacitor according to the invention at an operating voltage between 100 and 530 V. Particularly when using ammonium trans-4-phenyl-3-butenoate as derivatized aromatic carboxylic acid, use of the capacitor according to the invention at an operating voltage of up to 530 V is conceivable.

The invention is explained in greater detail below on the basis of exemplary embodiments and the associated FIGURE.

DESCRIPTION OF THE DRAWING

The FIGURE shows as an example the capacitor coil of an aluminum electrolytic capacitor according to the invention, in schematic cross section.

DETAILED DESCRIPTION

The capacitor coil of the electrolytic capacitor according to the invention consists of an anode layer 1, which has an anode oxide layer 4 on its top side. Anode layer 1 is an aluminum foil with a thickness of about 50–120 µm. Anode oxide layer 4 consists of aluminum oxide, and has a thickness of between 0.05 and 2 µm.

Positioned above anode oxide layer 4 is a separating layer 3. Separating layer 3 has a thickness between 30 and 200 µm, and consists preferably of paper. Positioned above separating layer 3 is a cathode layer 2, which has a cathode oxide layer 5 on its side facing toward separating layer 3. Separating layer 3 is impregnated with the operating electrolyte according to the invention.

Cathode layer 2 is made of aluminum, and has a thickness between 20 and 60 μm. Cathode oxide layer 5 consists of aluminum oxide and has a thickness between 1.5 and 3 nm. Anode layer 1 and cathode layer 2 each have electrically conductive connections to a capacitor connector 6.

The stack of layers shown in the FIGURE normally is in the form of a coil wound around a mandrel, which is built into an aluminum cup.

In the following Table 1, six different exemplary embodiments of an operating electrolyte according to the invention (B2 through B7) are compared to a known operating electrolyte (B1) in regard to their composition, their conductivity and their sparking voltage.

TABLE 1

Composition of various operating electrolytes

|  | B1 | B2 | B3 | B4 | B5 | B6 | B7 |
|---|---|---|---|---|---|---|---|
| Ethylene glycol [weight %] | 96 | 96 | 96 | 96 | 96 | 96 | 96 |
| Ammonium benzoate [weight %] | 4 | 0 | 0 | 0 | 0 | 0 | 0 |
| Ammonium cinnamate [weight %] | 0 | 4 | 0 | 0 | 0 | 0 | 0 |
| Ammonium o-methyl-cinnamate [weight %] | 0 | 0 | 4 | 0 | 0 | 0 | 0 |
| Ammonium p-methyl-cinnamate [weight %] | 0 | 0 | 0 | 4 | 0 | 0 | 0 |
| Ammonium α-methyl cinnamate [weight %] | 0 | 0 | 0 | 0 | 4 | 0 | 0 |
| Ammonium 4-hydroxy cinnamate [weight %] | 0 | 0 | 0 | 0 | 0 | 4 | 0 |
| Ammonium trans-4-phenyl-3-butenoat [weight %] | 0 | 0 | 0 | 0 | 0 | 0 | 4 |
| Conductivity [mS/cm] | 1.4 | 1.1 | 1.1 | 1.1 | 1.1 | 1 | 1 |
| Spark voltage [V] | 300 | 525 | 120 | 510 | 460 | 420 | 530 |

The exemplary embodiments show that the sparking voltage can be increased substantially in some cases by replacing ammonium benzoate with a derivatized aromatic carboxylic acid. At the same time, the conductivity changes only slightly; it is reduced somewhat compared to the known operating electrolyte (B1).

The operating electrolytes according to B2, B4 and B7 in particular show a significantly increased sparking voltage and permit an aluminum electrolytic capacitor made with them to be used at corresponding elevated operating voltages.

The invention is not confined to the embodiments shown as examples, but is defined in its most general form by Claim 1 and Claim 5.

What is claimed is:

1. An electrolyte for an aluminum electrolytic capacitor, the electrolyte comprising:
   (a) 70–99 wt. % of ethylene glycol; and
   (b) 1–20 wt. % of a substance which is selected from a group which comprises the following carboxylic acids and carboxylic acid salts:
   substituted cinnamic acids,
   ammonium cinnamate,
   ammonium α-methyl cinnamate, and
   ammonium trans-4-phenyl-3-butenoate.

2. The electrolyte according to claim 1, comprising:
   90–99 wt. % ethylene glycol, and
   1–10 wt. % of the substance selected from the group.

3. The electrolyte according to claim 1, wherein the substituted cinnamic acids comprise ammonium-o-methyl cinnamate, ammonium-p-methyl cinnamate, and ammonium 4-hydroxycinnamate.

4. An aluminum electrolytic capacitor, comprising:
   the electrolyte of claim 1; and
   a capacitor winding comprising:
     an anode layer;
     a cathode layer; and
     a dielectric layer between the anode layer and the cathode layer, the dielectric layer being saturated with the electrolyte;
     wherein the anode layer and the cathode layer each have an oxide layer on a side facing the dielectric layer.

5. The aluminum electrolytic capacitor according to claim 4 having an operating voltage between 100–530 V.

6. The electrolyte of claim 2, wherein the substituted cinnamic acids comprise ammonium-o-methyl cinnamate, ammonium-p-methyl cinnamate, and ammonium 4-hydroxycinnamate.

7. An aluminum electrolytic capacitor, comprising:
   the electrolyte of claim 2; and
   a capacitor winding-comprising:
     an anode layer;
     a cathode layer; and
     a dielectric layer between the anode layer and the cathode layer, the dielectric layer being saturated with the electrolyte;
     wherein the anode layer and the cathode layer each have an oxide layer on a side facing the dielectric layer.

8. The aluminum electrolytic capacitor of claim 7 having an operating voltage between 100–530 V.

9. An aluminum electrolytic capacitor, comprising:
   the electrolyte of claim 3; and
   a capacitor winding comprising:
     an anode layer;
     a cathode layer; and
     a dielectric layer between the anode layer and the cathode layer, the dielectric layer being saturated with the electrolyte;
     wherein the anode layer and the cathode layer each have an oxide layer on a side facing the dielectric layer.

10. The aluminum electrolytic capacitor of claim 9 having an operating voltage between 100–530 V.

* * * * *